(12) United States Patent
Katalenich et al.

(10) Patent No.: US 12,531,168 B2
(45) Date of Patent: Jan. 20, 2026

(54) NUCLEAR REACTOR ASSEMBLIES, NUCLEAR REACTOR TARGET ASSEMBLIES, AND NUCLEAR REACTOR METHODS

(71) Applicant: Battelle Memorial Institute, Richland, WA (US)

(72) Inventors: Jeffrey A. Katalenich, Richland, WA (US); Bruce D. Reid, Pasco, WA (US); Robert O. Gates, Kennewick, WA (US); Andrew W. Prichard, Pasco, WA (US); Bruce E. Schmitt, Kennewick, WA (US); Jim Livingston, Vienna, VA (US)

(73) Assignee: Battelle Memorial Institute, Richland, WA (US)

( * ) Notice: Subject to any disclaimer, the term of this patent is extended or adjusted under 35 U.S.C. 154(b) by 622 days.

(21) Appl. No.: 17/730,203

(22) Filed: Apr. 27, 2022

(65) Prior Publication Data
US 2022/0277865 A1    Sep. 1, 2022

Related U.S. Application Data

(62) Division of application No. 16/902,177, filed on Jun. 15, 2020, now Pat. No. 11,842,823, which is a
(Continued)

(51) Int. Cl.
*G21G 1/02* (2006.01)
*C01G 56/00* (2006.01)
(Continued)

(52) U.S. Cl.
CPC ............. *G21G 1/02* (2013.01); *G21G 1/001* (2013.01); *H05H 6/00* (2013.01); *C01G 56/004* (2013.01);
(Continued)

(58) Field of Classification Search
CPC .. G21G 1/02; G21G 1/001; G21G 2001/0094; H05H 6/00; C01G 56/004;
(Continued)

(56) References Cited

U.S. PATENT DOCUMENTS

| 3,269,915 A | 8/1966 | Ransohoff et al. |
| 4,459,245 A * | 7/1984 | Ryon ........................ B01J 2/08 |
| | | 252/635 |

(Continued)

FOREIGN PATENT DOCUMENTS

| CN | 106531278 B | 3/2017 |
| WO | WO 2004/040588 A | 5/2004 |

OTHER PUBLICATIONS

Haas et al., "Feasibility of the Fabrication of Americium Targets", Nuclear Energy Association (1999). (Year: 1999).
(Continued)

*Primary Examiner* — Adil A. Siddiqui
(74) *Attorney, Agent, or Firm* — Wells St. John P.S.

(57) ABSTRACT

Reactor target assemblies are provided that can include a housing defining a perimeter of at least one volume and Np or Am spheres within the one volume. Reactor assemblies are provided that can include a reactor vessel and a bundle of target assemblies within the reactor vessel, at least one of the target assemblies comprising a housing defining a volume with Np or Am spheres being within the volume. Irradiation methods are also provided that can include irradiating Np or Am spheres within a nuclear reactor, then removing the irradiated spheres from the reactor and treating the irradiated spheres.

12 Claims, 12 Drawing Sheets

Related U.S. Application Data division of application No. 15/476,870, filed on Mar. 31, 2017, now Pat. No. 10,685,757.

(51) Int. Cl.
| | |
|---|---|
| *C22B 60/04* | (2006.01) |
| *G21C 3/28* | (2006.01) |
| *G21C 3/58* | (2006.01) |
| *G21G 1/00* | (2006.01) |
| *H05H 6/00* | (2006.01) |

(52) U.S. Cl.
CPC ............ *C01G 56/005* (2013.01); *C22B 60/04* (2013.01); *G21C 3/28* (2013.01); *G21C 3/58* (2013.01); *G21G 2001/0094* (2013.01); *Y02E 30/30* (2013.01)

(58) Field of Classification Search
CPC ........ C01G 56/005; C22B 60/04; G21C 3/28; G21C 3/58; Y02E 30/30
See application file for complete search history.

(56) References Cited

U.S. PATENT DOCUMENTS

| | | | |
|---|---|---|---|
| 5,342,283 | A | 8/1994 | Good |
| 6,738,446 | B2 | 5/2004 | Venneri et al. |
| 6,896,716 | B1 | 5/2005 | Jones, Jr. |
| 2003/0156675 | A1* | 8/2003 | Venneri ................ G21G 1/10 376/189 |
| 2014/0334595 | A1 | 11/2014 | Bashkirtsev et al. |
| 2017/0243662 | A1 | 8/2017 | Schleicher et al. |

OTHER PUBLICATIONS

Howe et al., Economical Production of Pu-238: NIAC Phase I Final Report, No. HQ-E-DAA-TN33538 (2016). (Year: 2016).

Nästren et al., "Synthesis of (Zr, Y, Am) O2-x transmutation targets", Journal of Nuclear Materials 433, No. 1-3 (2013): 314-318. (Year: 2013).

GB 1714723.2 Search Report, Mar. 13, 2018, Battelle Memorial Institute.

Bergeron, "Plutonium consumption and transmutation of neptunium or americium in the MHTGR core", CEA-CONF-12313, Centre d'Etudes de Saclay, 1995 (Year: 1995).

Borland et al., "Evaluation of Aqueous and Powder Processing Techniques for Production of Pu-238-Fueled General Purpose Heat Sources", Idaho National Laboratory INL/EXT-08-14017, Jun. 2008, United States, 220 pages.

Burney et al., "Direct Fabrication of 238PuO2 Fuel Forms", Savannah River Laboratory DP-1621, Jul. 1982, United States, 42 pages.

Duncan et al., "Properties and Behavior of 238Pu Relevant to Decontamination of Building 235-F", Savannah River Nuclear Solutions SRNL-STI-2009-00239, Jun. 2009, United States, 27 pages.

Goldmann et al., Neptunium Oxide Target Fabrication Facility Considerations for the Production of Plutonium-238, American Institute of Physics Conference Proceedings, Issue 301, 1994, United States, pp. 1463-1470.

Katalenich , "Production of Monodisperse, Crack-Free Cerium Oxide Microspheres by Internal Gelation Sol-Gel Methods", Doctor of Philosophy Dissertation, 2014, University of Michigan, United States, 298 pages.

Kent, "LASL Fabrication Flowsheet for GPHS Fuel Pellets", Los Alamos Scientific Laboratory LA-7972-MS, Aug. 1979, United States, 48 pages.

Lorence, "Lessons Learned from Type B Accident Investigation of the Aug. 5, 2003 Plutonium-238 Multiple Uptake Event at the Plutonium Facility, Los Alamos National Laboratory, New Mexico", National Nuclear Security Administration, Dec. 2003, United States, 15 pages.

Miotla, "Assessment of plutonium-238 production alternatives", US DOE, Briefing for Nuclear Energy Advisory Committee (NEAC) Meeting, Arlington VA, 2008 (Year:2008).

Pacific Northwest National Laboratory, "PNNL Recognized with DOE Sustainability Awards", Second Nature: Sustainability in Action vol. 2, No. 1, Available online at http://sustainable.pnnl.gov/newsletter/second_nature_v2n1.html, Dec. 2013, United States, 4 pages.

Rankin et al., "Production of Pu-238 Oxide Fuel for Space Exploration", Westinghouse Savannah River Company WSRC-MS-2000-00061, 2000, United States, pp. 179-186.

Ledergerber et al., "Application of Gel-Co-Conversion for TRU(Pu, Np, Am) Fuel and Target Preparation", American Nuclear Society, Sep. 1992, United States, pp. 1273-1281.

Nastren et al., "Synthesis Route for the Safe Production of Targets for Transmutation of Plutonium and Minor Actinides", American Nuclear Society vol. 181, 2013, United States, pp. 331-336.

\* cited by examiner

NUCLEAR REACTOR ASSEMBLIES, NUCLEAR REACTOR TARGET ASSEMBLIES, AND NUCLEAR REACTOR METHODS

CROSS REFERENCE TO RELATED APPLICATION

This application is a divisional of U.S. patent application Ser. No. 16/902,177 filed Jun. 15, 2020, which is a divisional of U.S. patent application Ser. No. 15/476,870 filed Mar. 31, 2017, entitled "Nuclear Reactor Assemblies, Nuclear Reactor Target Assemblies, and Nuclear Reactor Methods", now U.S. Pat. No. 10,685,757 issued Jun. 16, 2020, the entirety of each of which is incorporated by reference herein

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

The present disclosure relates generally to nuclear reactors, nuclear target assemblies, and nuclear methods. More specifically, the present disclosure relates to Pu-238 production target assemblies, reactor assemblies, and designs, and generally relates to commercial reactors as well.

BACKGROUND

Nuclear reactors have been used to produce commercially valuable products. For example, isotopes for medical industrial use and plutonium have been produced using nuclear reactors. Specific grades of plutonium have also been produced as well. One such avenue to production of Pu-238 is the nuclear reaction of americium (Am) and/or neptunium (Np) to produce Pu-238.

It is clear that a Pu-238 source is more necessary than ever as in at least one example, Pu-238 can provide the heat source for radioisotope power systems and radioisotope heater units used in NASA space exploration missions and in national security applications. Kilogram-scale production of Pu-238 has not occurred in the United States since 1988, but small quantities of Pu-238 from process demonstrations have been produced at Oak Ridge National Laboratory using the high flux isotope reactor research reactor and theorized at the Idaho National Laboratory using the advanced test reactor research reactor. NASA missions requiring nuclear power have been relying on existing inventories and purchases from Russia, which were suspended in 2009. There are no known sources of Pu-238 outside the U.S. and Russia stockpiles; thus, the total amount available for mission use is fixed. The quantity of Pu-238 that can be produced by research reactors in the United States is limited, constraining the future use of Pu-238 for national security, NASA, and international space agencies. Although the European Space Agency is investigating the use of Am-241 for radioisotope heat and power sources due to its availability in the United Kingdom from aged civilian plutonium stockpiles, Pu-238 is the preferred isotope for space applications.

High-power production reactors have been shut down in the U.S., leaving only the high-power reactors remaining being commercial reactors. Commercial reactors operate at a much higher temperature, and the previous Pu-238 production target designs are not compatible with commercial reactor operating schemes. For example, targets placed in commercial reactors must be able to survive condition 1, 2, and 3 events and not contribute any adverse consequences to the outcome of a condition 4 accident.

As mentioned, past techniques used for producing kilogram quantities of Pu-238 are based on the irradiation of aluminum targets containing neptunium-237 oxide in a nuclear reactor. Post irradiation, aluminum can be dissolved in a caustic bath followed by acid dissolution of the remainder of the target. Following recovery and purification, Pu-238 can be precipitated from a nitrate solution, calcined to an oxide, and processed as a powder into heat source pellets. However, powder processing of Pu-238 oxide is known to create dispersible particles, resulting in gross contamination of glove box equipment, loss to holdup, and significant fractions requiring recycling. In addition to the assemblies provided, a method is also provided that details a sol-gel process for fabricating spheres or microspheres of Np-237 oxide and/or Pu-238 oxide. This allows for the irradiation techniques described herein as well as new and additional irradiation techniques. It reduces contamination during Pu-238 oxide handling and improves Pu-238 oxide processing efficiency, which allows for new Pu-238 oxide heat sources.

The present disclosure provides reactor assemblies, target assemblies, and methods that in certain circumstances can meet the performance metrics that permit use in a commercial reactor. Further, embodiments of the disclosure provide features that can enhance material recovery efficiencies following irradiation, and this may reduce waste volumes compared to prior legacy target assemblies. The present disclosure provides reactor assemblies, reactor target assemblies and methods that can be used to produce Pu-238 from, for example, Am or Np spheres.

SUMMARY OF THE DISCLOSURE

Reactor target assemblies are provided that can include a housing defining a perimeter of at least one volume and Np or Am spheres within the one volume.

Reactor assemblies are provided that can include a reactor vessel and a bundle of target assemblies within the reactor vessel, at least one of the target assemblies comprising a housing defining a volume with Np or Am spheres being within the volume.

Methods are also provided that can include irradiating Np or Am spheres, such as within a nuclear reactor, then removing the irradiated spheres from the irradiation location and processing the irradiated spheres.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
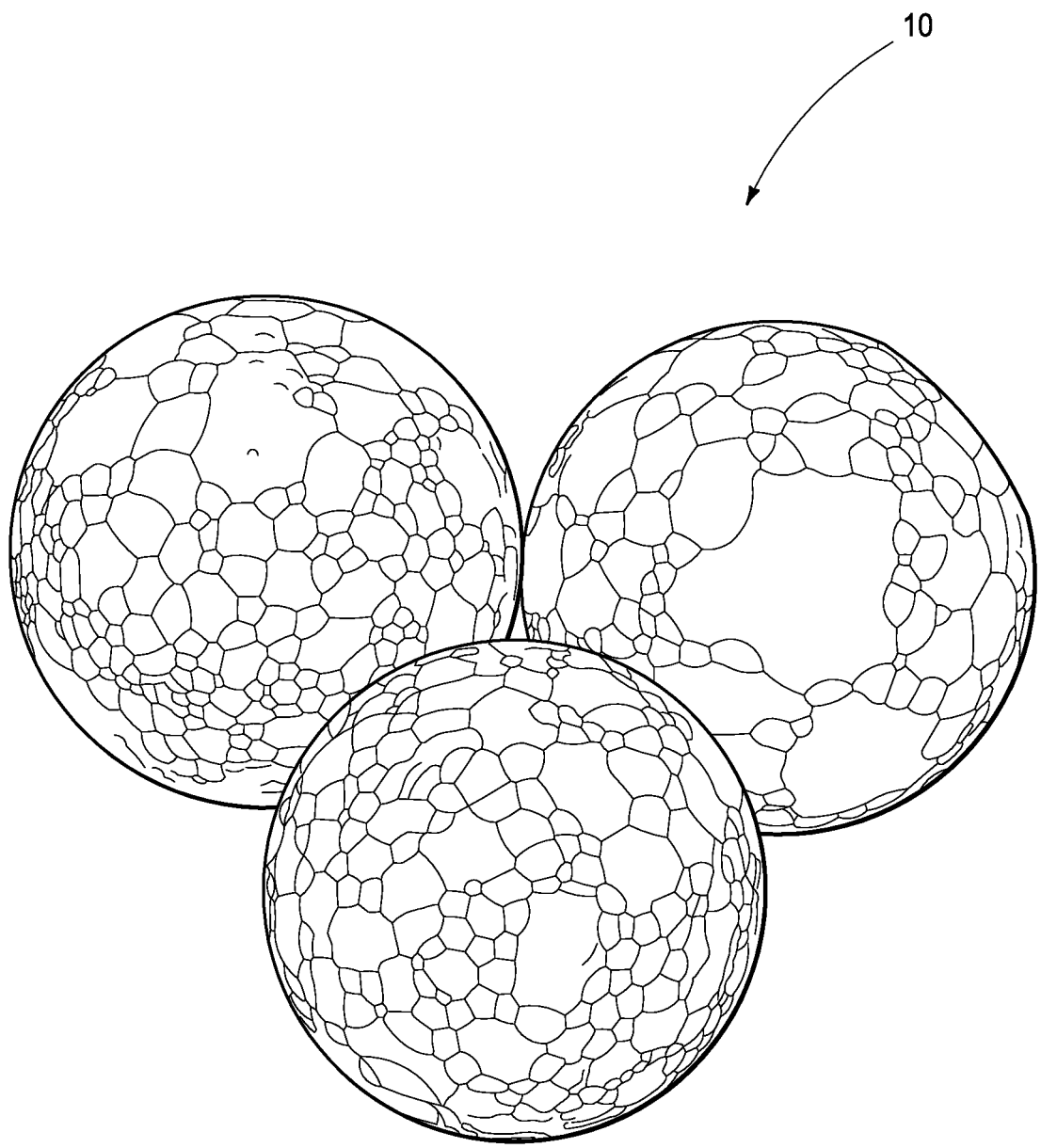
FIG. 1 is a depiction of a group of Np or Am spheres according to an embodiment of the disclosure.

The present disclosure will be described with reference to FIGS. 1-11. Referring first to FIG. 1, a group of spheres 10 is shown, and these spheres represent americium and/or neptunium spheres that can be produced and utilized in accordance with example embodiments of the present disclosure. These spheres can be considered microspheres that are flowable and easily handled, allowing them to be simply poured into complex or simple target geometries prior to irradiation, and then poured out after irradiation. Complex geometries may allow for improvements in isotopic purity of Pu-238 products and/or mitigation neptunium fission.

These spheres may be loaded into refractory materials to form part of a target assembly that is survivable at elevated reactor or commercial reactor temperatures and can also withstand accident-scenario temperatures. These spheres can be produced by sol-gel process, and this sol-gel process can be used to generate Np-237, Pu-239, and/or Pu-238 as well as Am-241 spheres.

The process can be initiated by creating concentrated solutions of a nitrate of the desirable element such as $^{237}$Np(IV) nitrate, $^{239}$Pu(IV) nitrate, and/or $^{238}$Pu(IV) nitrate that benefit from free acid concentrations below 4M. Valence adjustments can be made using a reductant such as hydrazine for neptunium and hydrogen peroxide for plutonium, for example. Other reducing agents may also be used to obtain the tetravalent state of neptunium and/or plutonium.

Pre-chilled Np-237, Pu-239, and Pu-238 nitrate precursor feed solutions can be mixed with pre-chilled precursor aqueous solutions containing both 3.18M hexamethylenetetramine (HMTA) and 3.18M urea and chilling same to approximately 0° C. Conditions for formation of gels benefit from high neptunium or plutonium concentrations, HMTA, and urea concentrations in precursor solutions. Typically, the HMTA and urea can be dissolved near their combined solubility limit at approximately 3.2M. Neptunium or plutonium feed solutions are prepared by re-wetting moist neptunium or plutonium nitrate crystals with nitric acid at a concentration of ≤4M and neutralized hydrazine or hydrogen peroxide to obtain a [Np(IV)] or [Pu(IV)] near 2M.

Hydroxide may be added to the nitrate solutions to eliminate free acid and increase the solution pH. Hydroxide addition can be limited to that which keeps the initial mixed feed solution pH below that which initiates precipitation. Mixed feed can be defined as the combined, chilled metal nitrate solution and HMTA/urea solution. It is believed that operable conditions are broader than the conditions described herein, with more dilute metal nitrate and HMTA/urea solutions being satisfactory, but higher temperatures and longer heating durations being utilized to provide the gel. Additionally, as solutions become too dilute, resultant gels can become weaker to the point of becoming viscous suspensions.

Gelation does not appear to be sensitive to the urea/Np ratio so long as adequate urea is present (>1 mole urea per mole Np) to prevent gelation while chilled near 0° C. Gelation can be sensitive to the HMTA/Np ratio, with low ratios (<1) resulting in weak gels and high ratios (>3) resulting in gelation while chilled near 0° C. (referred to as premature gelation). Table 1 below provides an initial gelation result at a hydroxide to neptunium ratio of 0.75 and HMTA to neptunium ratios ranging from 1.5-2.5. At this concentration of precursor solutions and hydroxide content, an HMTA ratio of 2.0 can be utilized for gelling.

TABLE 1

Quality of Np-237 Gels vs. HMTA Content

| OH$^-$/Np | 0.75 |
|---|---|
| HMTA/Np | |
| 1.5 | U |
| 1.75 | S |
| 2.0 | S* |
| 2.25 | S |
| 2.5 | P |

U = Unsatisfactory gel
S = Satisfactory gel
P = Premature gelation
*= Ideal condition With regard to Pu-239 gels, high plutonium, HMTA, and urea concentrations in precursor solutions can be utilized. Typically, HMTA and urea can be dissolved near their combined solubility limit at approximately 3.2M. Plutonium feed solutions can be prepared by re-wetting moist plutonium nitrate crystals with nitric acid at a concentration of ≤4M and hydrogen peroxide to obtain a [Pu(IV)] near 2M. Hydroxide may be added to the Pu-239 nitrate solution to reduce free acid and increase the solution pH. Preferably, hydroxide addition can be limited to that which keeps the initial mixed feed solution pH below 4.5. The mixed feed can be defined as above.

Gelation can be sensitive to the HMTA/Pu ratio, with low ratios (<1) resulting in weak gels and high ratios (>3) resulting in gelation while chilled near 0° C. (referred to as premature gelation). Table 2 provides initial gelation results at a hydroxide to plutonium ratio of 0.75 and 1.0, and HMTA to plutonium ratios ranging from 1.5-2.5. At this concentration of precursor solutions and hydroxide content, an HMTA ratio of 2.25 and OH$^-$/Pu ratio of 0.75 can be utilized for gelling.

TABLE 2

Quality of Pu-239 Gels vs. HMTA and Hydroxide Content

| R-Value/OH$^-$/Pu | 0.75 | 1.0 |
|---|---|---|
| 1.5 | U | U |
| 1.75 | S | S |
| 2.0 | S | S |

TABLE 2-continued

Quality of Pu-239 Gels vs. HMTA and Hydroxide Content

| R-Value/OH⁻/Pu | 0.75 | 1.0 |
|---|---|---|
| 2.25 | S* | S |
| 2.5 | S | P |

U = Unsatisfactory gel
S = Satisfactory gel
P = Premature gelation
*= Ideal condition Pu-238 gels can be generated using a similar approach to that described above with reference to Pu-239. However, in comparison to Pu-239, Pu-238 can generate decay heat and radiolysis products. Thus, Pu-238 in nitric acid may form bubbles and create radiolysis products causing oxidation to $^{238}$Pu(VI) and may require more reductant than an equivalent quantity of Pu-239.

Neptunium, plutonium, and/or americium stock materials are converted to an aqueous nitrate solution. The valence state of the neptunium or plutonium is generally reduced to Np(IV) or Pu(IV) using a reducing agent such as hydrazine or hydrogen peroxide. The starting solution is acidic but can be partially neutralized in pH, such as by the addition of concentrated ammonium hydroxide solution or exposure to ammonium hydroxide vapors. As described above, the HMTA to urea concentration can be 3.18M and mixed with the metal nitrate solution in a 2:1 HMTA to metal mole ratio. Prior to mixing and once mixed, these solutions are chilled to a temperature between their freezing point and a temperature that would cause gelation. Generally, the solutions are chilled between −5° C. and 0° C. This mixture of metal nitrate and organic solution can be metered through a needle in a 2-fluid nozzle that is chilled to prevent gelation in the nozzle. The microspheres formed by the nozzle can be heated to about 80° C. in a forming fluid such as oil and then flowed into a mesh basket for collection of gelled microspheres. According to example implementations, upon production, these gelled spheres can be from 20 to 1000 μm in diameter and/or from 10 to 500 μm in diameter upon drying. Generally speaking, the gelled microspheres containing neptunium, plutonium, and/or americium may be washed to remove the forming fluid and excess reagents. As an example, the gelled spheres can be washed with a solvent, such as trichloroethylene and isopropyl alcohol, or an emulsifying agent to remove oil forming fluids and also washed in a basic solution such as an ammonium hydroxide solution to leach impurities. Prior to drying, there can be a hydrothermal treatment to remove organic impurities and/or excess water from the gelled spheres by heating the gelled and washed spheres to about 200° C. After the hydrothermal treatment, the microspheres may be rinsed with water and then dried, producing the metal oxide of the desired materials such as the neptunium oxide, the americium oxide, or the plutonium oxide. Spheres may be heat treated and pressed into a pellet. In particular embodiments neptunium and/or americium spheres may be treated with less heat than plutonium spheres. This lower heat treatment can improve material recovery after irradiation.

Figure 2:
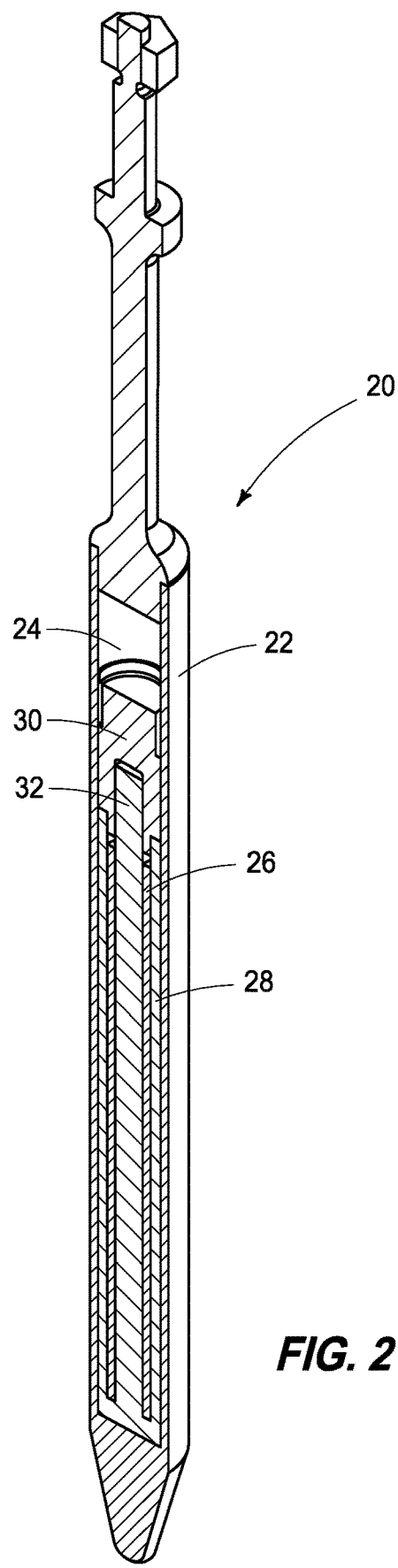
FIG. 2 is a cross-section of a target assembly according to an embodiment of the disclosure.

Referring next to FIG. 2, target assembly 20 according to an embodiment of the disclosure is provided. As can be seen, target assembly 20 includes a housing 22 that defines a volume 24. At least part of this volume 24 may be occupied by other materials, including the Np or Am spheres 26. This housing can be at least partially stainless steel or zircaloy, for example, in certain circumstances, but typically sufficient to be utilized in a commercial reactor. As can be seen in this one embodiment, spheres 26 can occupy a portion of the interior volume 24.

Figure 3:
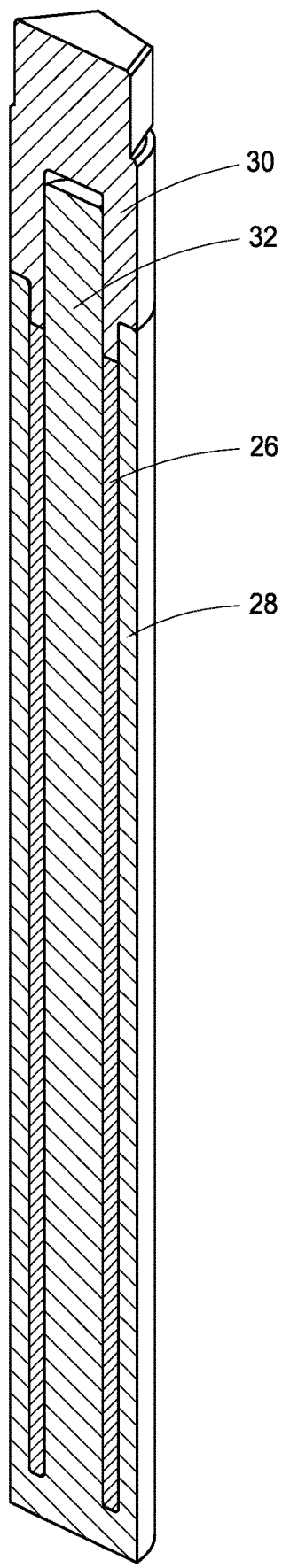
FIG. 3 is a cross-section of a portion of the target assembly of FIG. 2 according to an embodiment of the disclosure.
Figure 4:
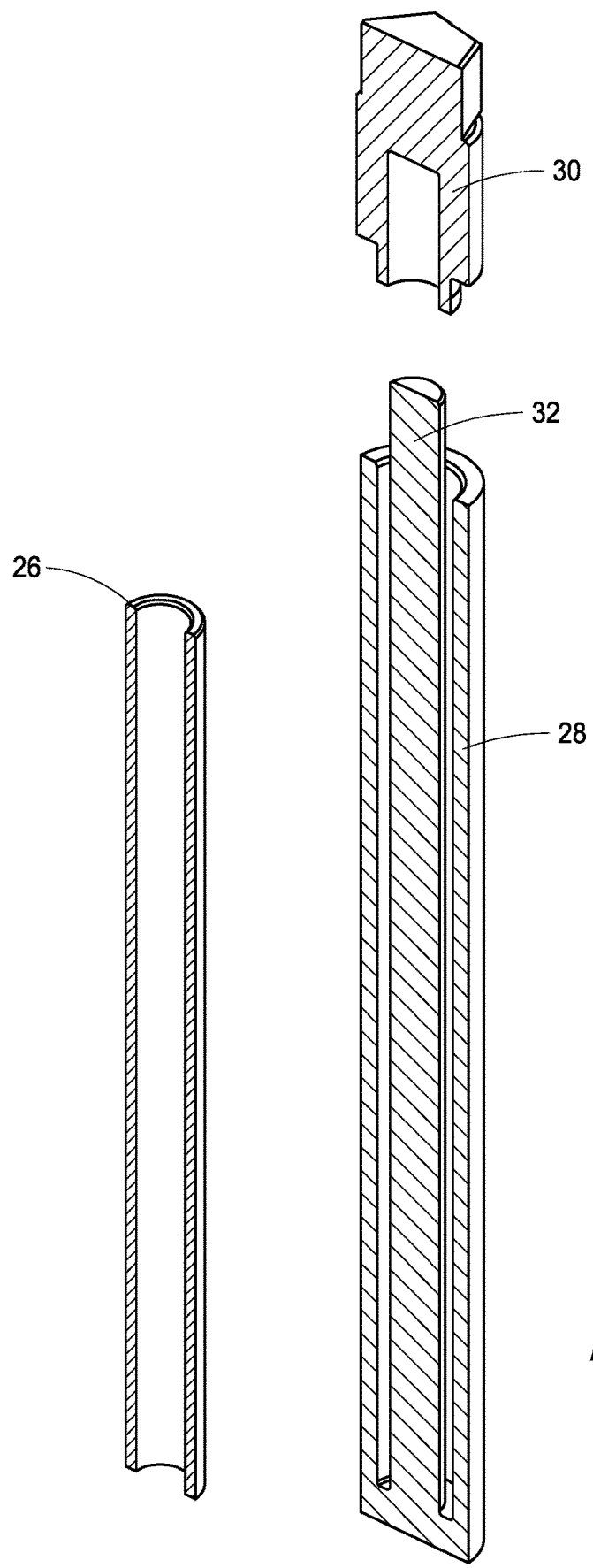
FIG. 4 is an exploded view of the cross-section of FIG. 3 according to an embodiment of the disclosure.

Referring next to FIG. 3, a cross-section of a portion of target assembly 20 is shown detailing the portion 26 identifying the spheres contained within the target assembly. Referring next to FIG. 4, a pop-out or exploded view of the spheres within target assembly 20 is shown, demonstrating a geometry within the target assembly 20. This geometry can be brought about by a ceramic insert 28, and this ceramic insert may have a ceramic cap portion 30, as well as a core portion 32. This ceramic portion can be a graphite or carbon for example, and in accordance with at least one example implementation, can have a circular cross-section as well as the target assembly having a circular cross-section.

Figure 5:
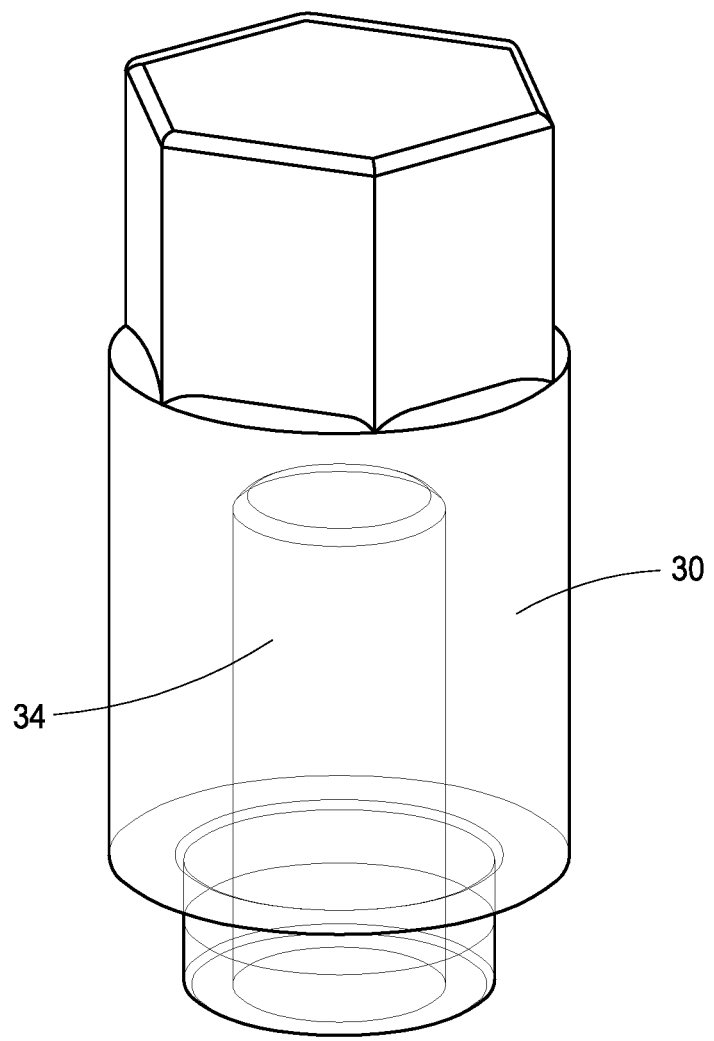
FIG. 5 is a depiction of a portion of the target assembly of FIG. 3 according to an embodiment of the disclosure.
Figure 6:
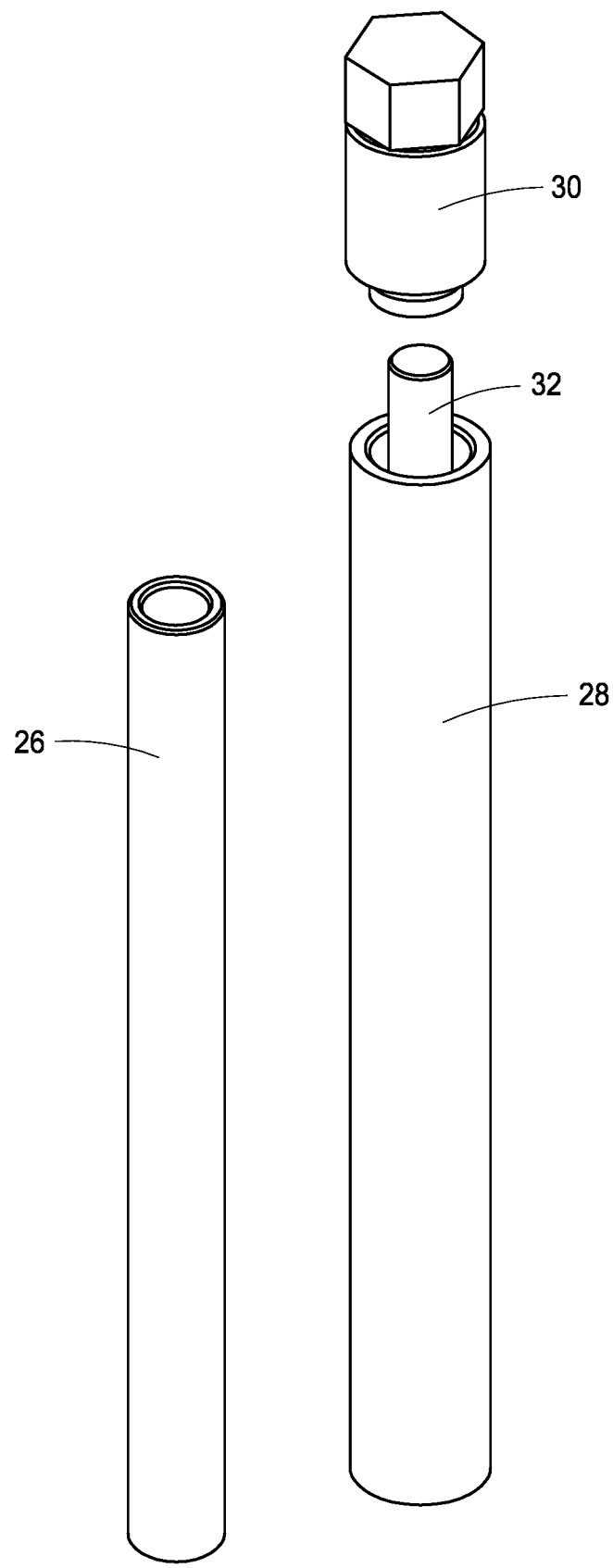
FIG. 6 is an exploded view of a portion of the target assembly of FIG. 2 according to an embodiment of the disclosure.
Figure 7:
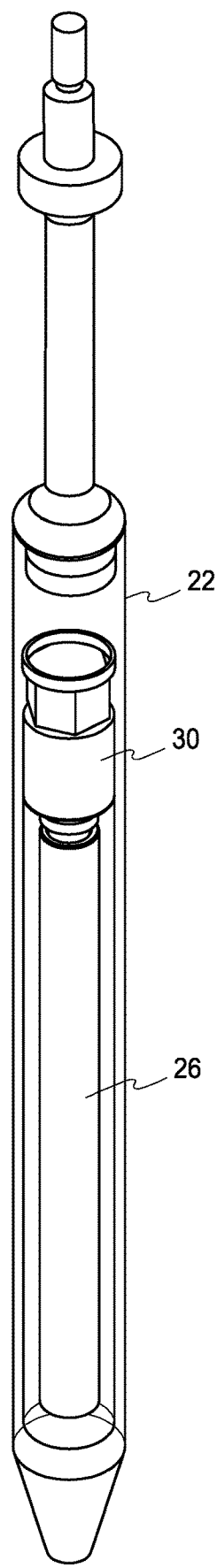
FIG. 7 is another view of a target assembly according to an embodiment of the disclosure.
Figure 8:
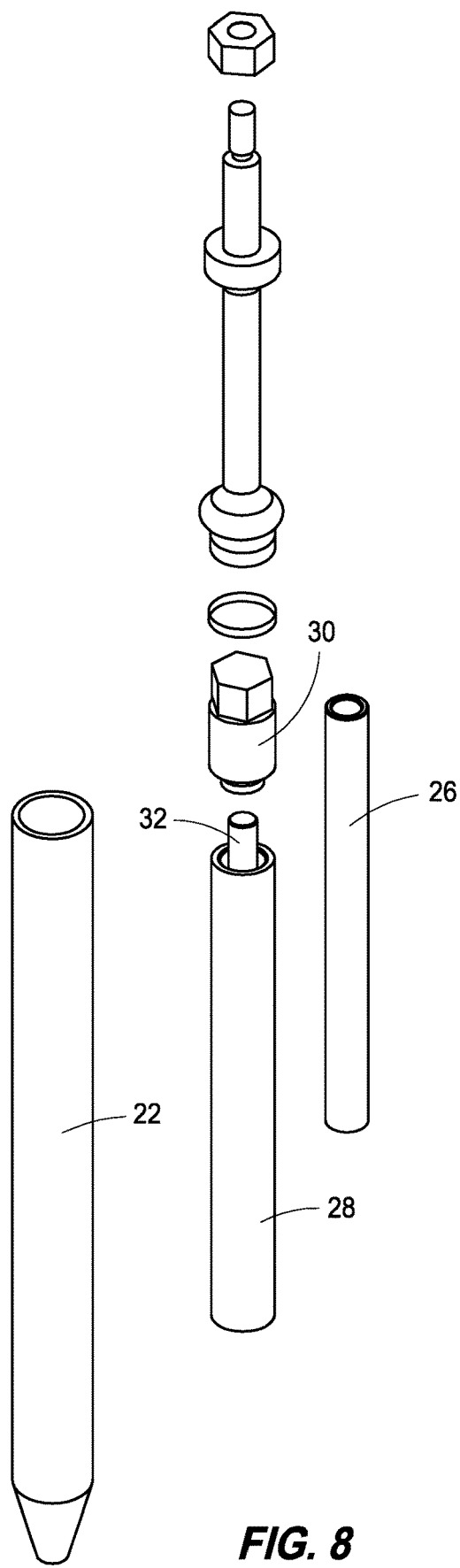
FIG. 8 is an exploded view of the target assembly of FIG. 7 according to an embodiment of the disclosure.

Referring to FIG. 5, a detailed view of cap 30 is shown with a recess 34 configured to receive a core of ceramic insert 28. Referring next to FIGS. 6, 7, and 8, components of an example target assembly are shown in an exploded view, demonstrating cap 30, spheres 26, as well as ceramic insert 28 and core 32, for example. While geometries have been shown to include circular geometries, geometries including planar portions are contemplated as well, such as hexagonal geometries for example.

Figure 9A:
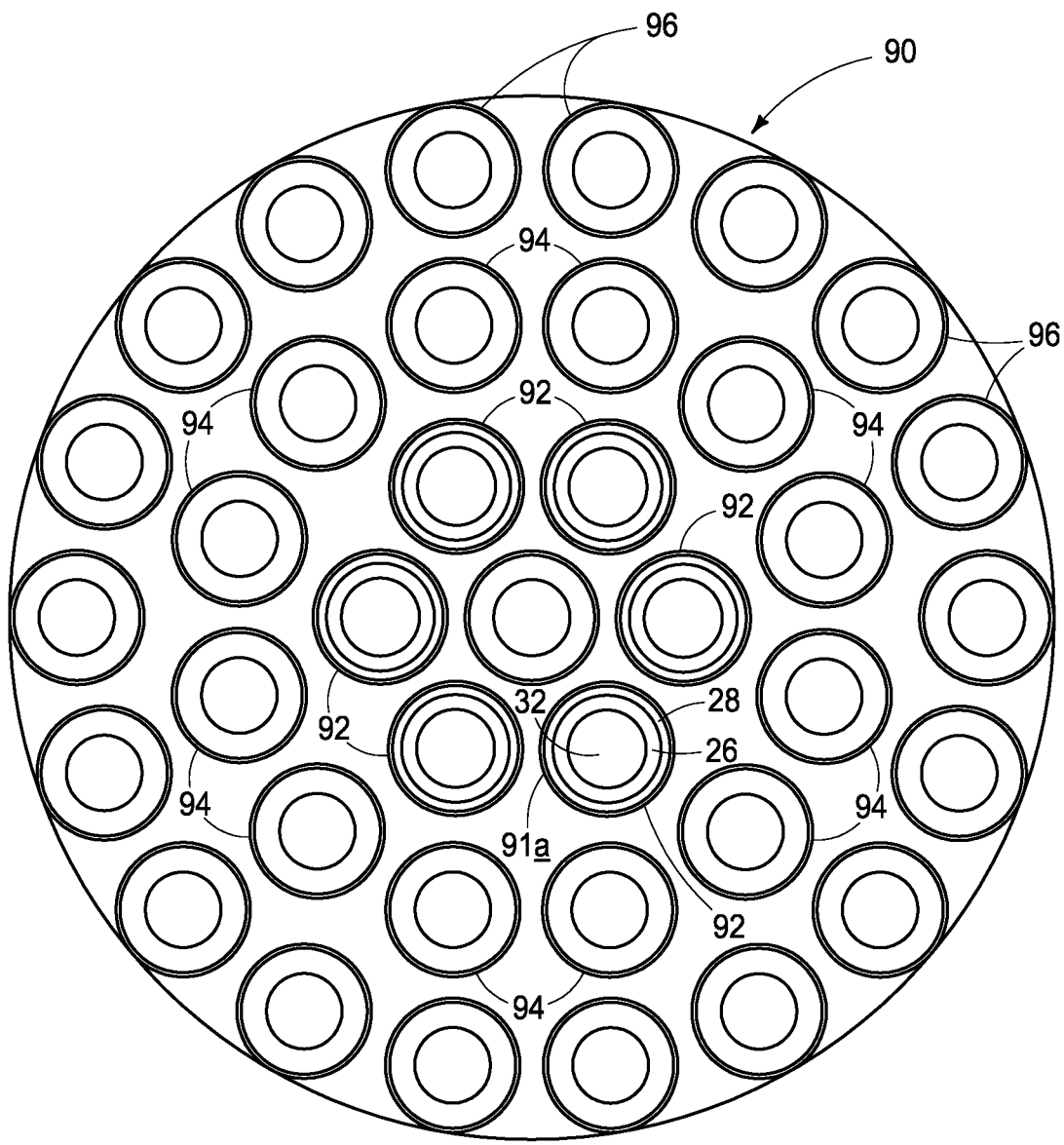
FIG. 9A is a cross-section view of a bundle of target assemblies according to an embodiment of the disclosure.
Figure 9B:
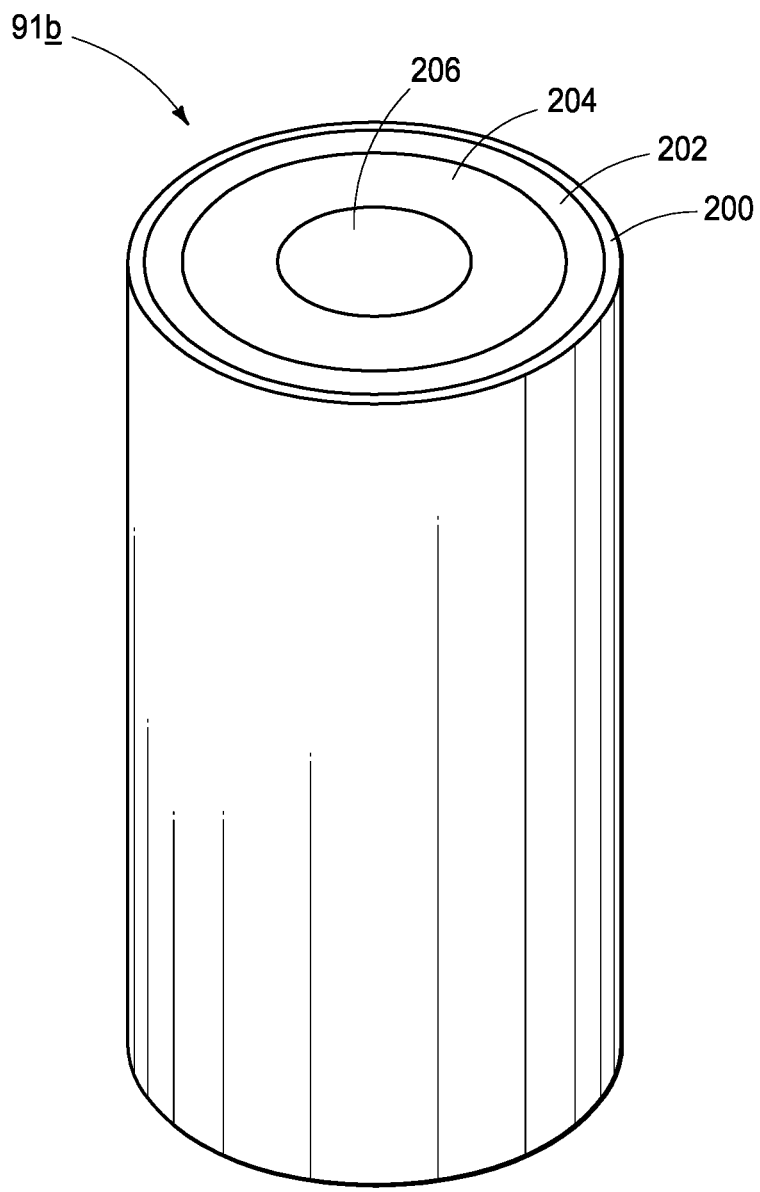
FIG. 9B is a cross-section view of a single target assembly within the bundle of target assemblies represented in FIG. 9A according to an embodiment of the disclosure.

Referring next to FIGS. 9A and 9B, a bundle 90 for insertion within a reactor assembly can include multiple target assemblies. In accordance with example implementations, bundle 90 can include a plurality of target assemblies. This cross-section view of bundle 90 is shown with the configuration of target assemblies arranged in concentric circles, with an inner circle 92 of individual target assemblies 91a, next level circle 94, and an outer circle 96. In accordance with example implementations, it can be desirable to place target assemblies containing the spherical target materials within the inner circle 92 as shown. Each of these target assemblies 91a may be configured as described herein, and may include spherical target material core 32 as well as liner 28 and ceramic material 26 between core 32 and liner 28. Liner 28 can be Tungsten or Tantalum, for example. In accordance with another example implementation and with reference to FIG. 9B, a target assembly 91b can be provided. Assembly 91b can include an outer layer 200 of Zircaloy for example, a liner 202 of tantalum or tungsten, for example, ceramic material 204 (graphite, for example), and spherical material 206 such as the Np or Am spheres of the present disclosure.

Figure 10:
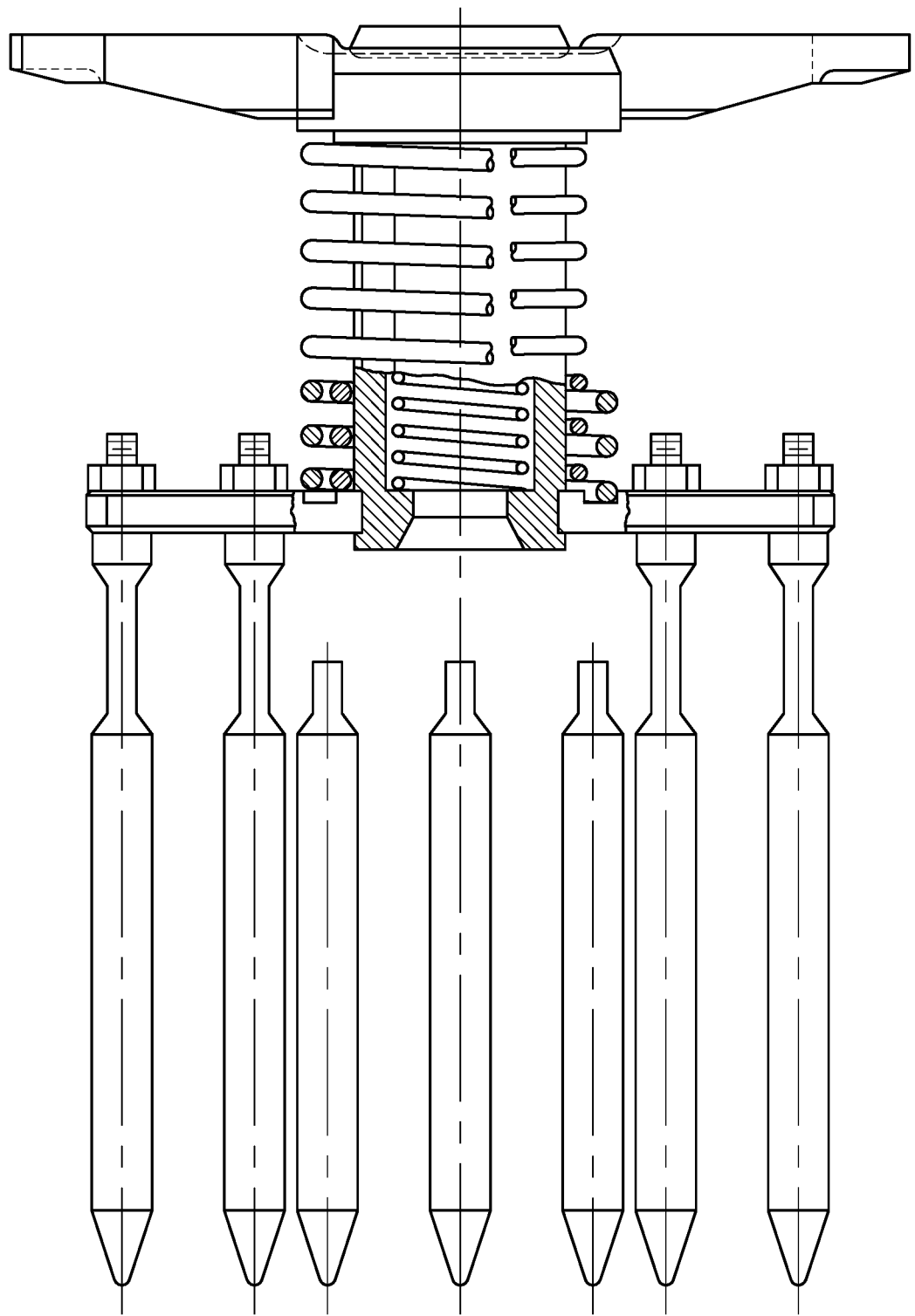
FIG. 10 is a side view of a bundle of target assemblies according to an embodiment of the disclosure.
Figure 11:
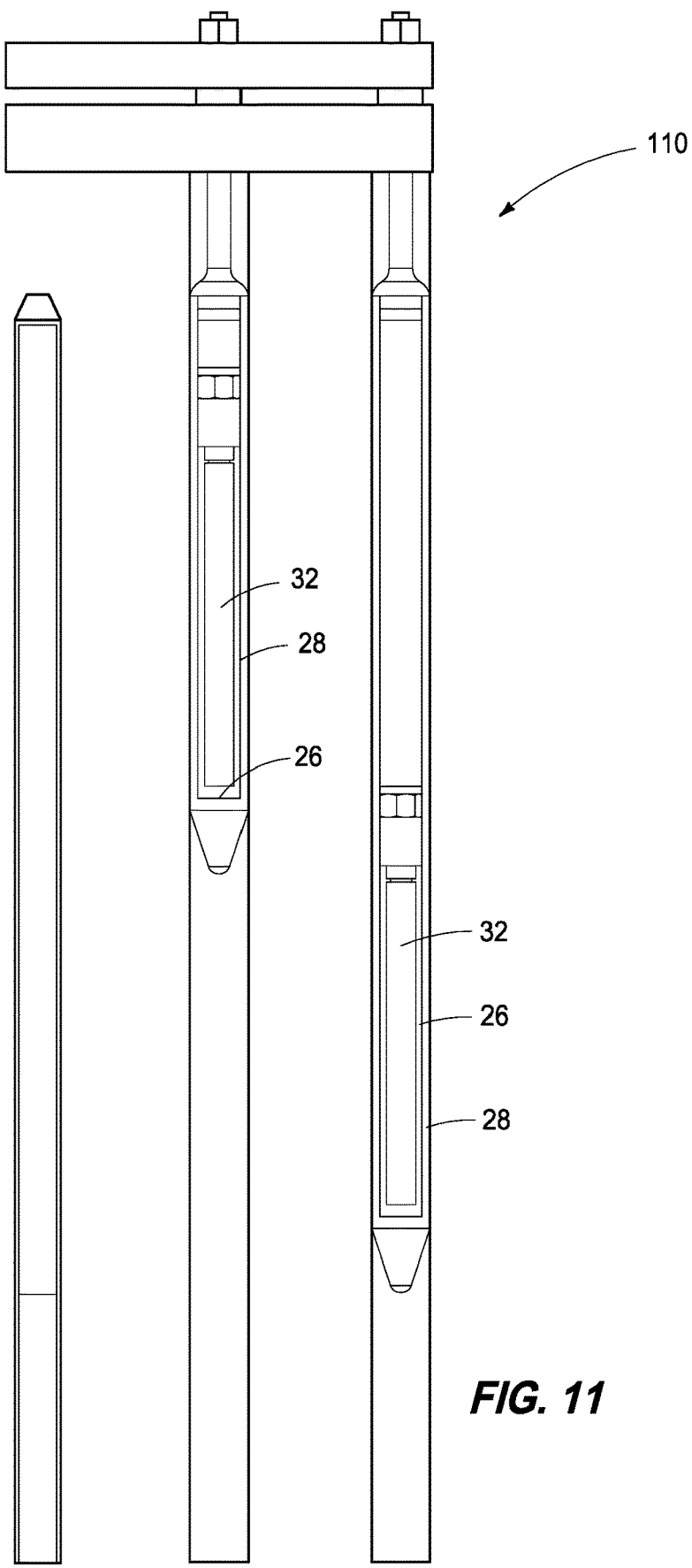
FIG. 11 is a view of a bundle of target assemblies according to an embodiment of the disclosure.

In accordance with example implementations, at least one side view of an example bundle is shown in FIG. 10. Referring next to FIG. 11, in accordance with example implementations, the bundle can have target assemblies configured specifically axially in relation to one another. In the configuration shown in FIG. 11 as configuration 110, it can be seen that the ceramic material and spherical material contained therein can be arranged juxtaposed to one another axially. In this circumstance, the target assembly can be arranged in two portions, wherein the spheres are contained within an upper portion or lower portion. In accordance with example implementations, these lower portions can be juxtaposed to one another and with spherical material in an upper portion while spherical material is arranged in a lower portion in a target assembly that is next to it.

These target assemblies and reactor assemblies can be irradiated to produce Pu-238. The duration of irradiation and position in the reactor may be selected to modify the neutron energy spectrum and total neutron influence on targets to control the percentage of Pu-238 produced. For example, an irradiation position and exposure time may be chosen to allow for 10% of the neptunium to transmute to plutonium.

Following irradiation, targets may be discharged from the reactor and allowed to decay for a period of time to decrease radioactivity. Irradiated bundles are disassembled and spheres are removed for acid dissolution. Spheres are low-fired and have high surface area, facilitating dissolution. Dissolved targets are processed to recycle neptunium, purify plutonium, and separate fission products. Separated and purified plutonium may be used to for making heat sources, for example by sol-gel methods.

Pu-238 heat sources have typically been produced by powder-processing methods that require precipitation, ball-milling, and granule formation by slugging and screening. For example, the current process for producing Pu-238 heat source pellets is a multi-step process. First, dissolved $^{238}$Pu (III)) nitrate is reverse strike precipitated using oxalic acid. The plutonium oxalate precipitate is then filtered and calcined to an oxide. Particle morphologies at this point include rosette and lathe-shaped particles, the latter of which cannot be used to press pellets and results in excessive shrinkage of pellets and cracking. Pu-238 oxide powders are ball milled to normalize the particle morphology and then hydraulically pressed into green pellets. Pellets are slugged through screens to obtain desirable particle sizes and then pre-sintered to adjust the ceramic activity. Thermally seasoned granules are then blended and loaded into a hot press die and hot pressed into a pellet. Pu-238 oxide pellets are substoichiometric in oxygen following hot pressing and are sintered in an oxygen-16 environment to re-oxidize.

In contrast, Pu-238 spheres can be obtained by mixing chilled solutions of Pu-238 nitrate with hexamethylenetetramine and urea and forming droplets of the desired size in a heated, immiscible phase. Gelled microspheres are washed to remove impurities, including a hydrothermal water treatment. A hydrothermal treatment removes impurities and increases the specific surface area of the dried oxide microspheres. After washing, spheres are air-dried and calcined to remove moisture. Production of spheres and/or use of same can prevent dust generation, reduce the number of processing steps, and/or facilitate production of higher quality pellets.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A method for producing spheres of Am, Np, or Pu for loading into refractory materials in a target assembly, the method comprising:
   preparing a solution comprising Am-nitrate, Np-nitrate, or Pu-nitrate;
   cooling the solution to −5° C. and 0° C. to gel the Am-nitrate, Np-nitrate, or Pu-nitrate;
   providing the gelled Am-nitrate, Np-nitrate, or Pu-nitrate through a conduit with another fluid to form gelled Am, Np, or Pu spheres;
   washing and drying gelled spheres to form solid Am, Np, or Pu spheres; and
   using the Am, Np, or Pu spheres in a target assembly.

2. The method of claim 1, wherein the providing the gelled Am-nitrate, Np-nitrate, or Pu-nitrate through a conduit with another fluid to form gelled Am, Np, or Pu spheres further comprises forming a mixed feed solution comprising the Am-nitrate, Np-nitrate, or Pu-nitrate.

3. The method of claim 2, wherein the mixed feed solution comprises HMTA.

4. The method of claim 2, wherein the mixed feed solution comprises urea.

5. The method of claim 2, further comprising changing the temperature of the mixed feed solution to greater than 0° C. to form the Am, Np, or Pu spheres.

6. The method of claim 1, further comprising providing the gelled Am, Np, or Pu from the conduit to a forming fluid.

7. The method of claim 6, further comprising removing the forming fluid when washing the gelled spheres.

8. The method of claim 7, further comprising washing the gelled spheres with a solvent.

9. The method of claim 8, wherein the solvent is trichloroethylene and/or isopropyl alcohol.

10. The method of claim 8, wherein the solvent comprises ammonium hydroxide.

11. The method of claim 1, wherein the drying comprises heating the washed spheres.

12. The method of claim 11, wherein, upon drying, the spheres are rinsed with water and dried to form oxide spheres.

* * * * *